United States Patent
Anderson et al.

(10) Patent No.: US 8,016,232 B2
(45) Date of Patent: Sep. 13, 2011

(54) AIRCRAFT CABIN PRESSURE DESCENT DETECTION AND CONTROL SYSTEM AND METHOD

(75) Inventors: Peter Mark Anderson, Georgetown (CA); Karen Hosler, Campbellville (CA); Greg Chapman, Scottsdale, AZ (US); Wai Pak Wong, Cerritos, CA (US)

(73) Assignee: Honeywell International Inc., Morristown, NJ (US)

( * ) Notice: Subject to any disclaimer, the term of this patent is extended or adjusted under 35 U.S.C. 154(b) by 776 days.

(21) Appl. No.: 12/129,463

(22) Filed: May 29, 2008

(65) Prior Publication Data

US 2009/0298407 A1    Dec. 3, 2009

(51) Int. Cl.
    B64D 11/00    (2006.01)
(52) U.S. Cl. ............ 244/118.5; 454/71; 454/70; 454/76
(58) Field of Classification Search ................ 244/118.5; 454/71, 70, 76, 74
    See application file for complete search history.

(56) References Cited

U.S. PATENT DOCUMENTS

| | | |
|---|---|---|
| 3,367,256 A | 2/1968 | Townsend et al. |
| 3,376,803 A | 4/1968 | Emmons |
| 5,186,681 A | 2/1993 | Emmons |
| 5,273,486 A | 12/1993 | Emmons et al. |
| 5,297,987 A | 3/1994 | Emmons et al. |
| 5,516,330 A | 5/1996 | Dechow et al. |
| 5,520,578 A | 5/1996 | Bloch et al. |
| 6,244,540 B1 | 6/2001 | Stabile et al. |
| 6,544,114 B2 | 4/2003 | Buchholz |
| 6,737,988 B2 | 5/2004 | Horner et al. |
| 6,761,628 B2 | 7/2004 | Horner |
| 7,264,017 B2 | 9/2007 | Denike et al. |
| 7,462,098 B2 * | 12/2008 | Arthurs et al. .............. 454/74 |
| 7,531,980 B2 * | 5/2009 | McCoy .................. 318/609 |
| 7,837,541 B2 * | 11/2010 | Gray et al. ............... 454/74 |
| 7,950,987 B2 * | 5/2011 | McCoy et al. ............ 454/74 |
| 2008/0032616 A1 | 2/2008 | Vogel |
| 2010/0216385 A1 * | 8/2010 | Heuer .................. 454/71 |

* cited by examiner

*Primary Examiner* — Christopher P Ellis
(74) *Attorney, Agent, or Firm* — Robert Desmond, Esq.

(57) ABSTRACT

Methods and apparatus are provided controlling aircraft cabin pressure, and more specifically engine bleed air manifold pressure, during aircraft descent. An aircraft engine bleed air manifold control pressure setpoint is to either a descent pressure setpoint or a cruise pressure setpoint by determining a rotational speed of an aircraft engine component, determining a component speed setpoint value, and determining aircraft vertical speed. The engine bleed air manifold control pressure setpoint is set to the descent pressure setpoint if either the determined rotational speed of the aircraft engine component is below the component speed setpoint value or the aircraft vertical speed is less than a predetermined vertical speed value.

25 Claims, 4 Drawing Sheets

AIRCRAFT CABIN PRESSURE DESCENT DETECTION AND CONTROL SYSTEM AND METHOD

TECHNICAL FIELD

The present invention generally relates to turbine engine bleed air pressurization control and, more particularly, to a system and method for determining when different bleed air pressures should be maintained.

BACKGROUND

For a given airspeed, an aircraft may consume less fuel at a higher altitude than it does at a lower altitude. In other words, an aircraft may be more efficient in flight at higher altitudes as compared to lower altitudes. Moreover, bad weather and turbulence can sometimes be avoided by flying above such weather or turbulence. Thus, because of these and other potential advantages, many aircraft are designed to fly at relatively high altitudes.

As the altitude of an aircraft increases, from its take-off altitude to its "top of climb" or "cruise" altitude, the ambient atmospheric pressure outside of the aircraft decreases. Thus, unless otherwise controlled, air could leak out of the aircraft cabin causing it to decompress to an undesirably low pressure at high altitudes. If the pressure in the aircraft cabin is too low, the aircraft passengers may suffer hypoxia, which is a deficiency of oxygen concentration in human tissue. The response to hypoxia may vary from person to person, but its effects generally include drowsiness, mental fatigue, headache, nausea, euphoria, and diminished mental capacity.

Aircraft cabin pressure is often referred to in terms of "cabin altitude," which refers to the normal atmospheric pressure existing at a certain altitude. Studies have shown that the symptoms of hypoxia may become noticeable when the cabin altitude is above the equivalent of the atmospheric pressure one would experience at 8,000 feet. Thus, many aircraft are equipped with a cabin pressure control system to, among other things, maintain the cabin pressure altitude to within a relatively comfortable range (e.g., at or below approximately 8,000 feet) and allow gradual changes in the cabin altitude to minimize passenger discomfort.

In addition to a cabin pressure control system, many aircraft also include an environmental control system (ECS) that supplies temperature-controlled ECS air to the aircraft cabin, and which also improves passenger comfort. Typically, a flow of bleed air from one or more of the aircraft engines is supplied to the ECS, which in turn conditions the bleed air and supplies the ECS air to the aircraft cabin. The ECS air, when flowing into the aircraft cabin, will also pressurize the aircraft cabin and cause a change in cabin altitude. Thus, the cabin pressure control systems in such aircraft typically include at least an outflow valve and a controller. The outflow valve is mounted on the aircraft bulkhead and, when open, fluidly communicates the aircraft cabin to the environment outside of the aircraft. The controller implements various control laws and supplies appropriate valve control signals to the outflow valve that modulates the position of the outflow valve. As a result, the ECS air supplied to the aircraft cabin is controllably released from the aircraft cabin to the environment outside of the aircraft to thereby control aircraft cabin altitude.

When an aircraft that is pressurized as described above descends, the aircraft engine throttles are typically retarded, resulting in decreased bleed air pressure. However, as may be appreciated, additional bleed air flow may be needed to increase cabin pressure (decrease cabin altitude) during aircraft descent. In some aircraft, if additional bleed air flow is needed during descent, the additional bleed air is supplied from another portion of the aircraft engine (e.g., high pressure compressor) by opening a valve. Although this methodology generally works well, it does suffer certain drawbacks. Specifically, during some aircraft descents the aircraft may experience bleed air pressure fluctuations and concomitant cabin pressure fluctuations. Both of these fluctuations can be disconcerting to both the flight crew and passengers.

Hence, there is a need for a system and method of controlling aircraft cabin pressure, and more specifically bleed air supply pressure, during aircraft descent that does not result in disconcerting bleed air pressure fluctuations and/or cabin pressure fluctuations. The present invention addresses at least this need.

BRIEF SUMMARY

In one embodiment, and by way of example only, a method of setting an aircraft engine bleed air manifold control pressure setpoint to one of a descent pressure setpoint or a cruise pressure setpoint includes determining a rotational speed of an aircraft engine component, determining a component speed setpoint value, and determining aircraft vertical speed. The engine bleed air manifold control pressure setpoint is set to the descent pressure setpoint if the determined rotational speed of the aircraft engine component is below the component speed setpoint value, or the aircraft vertical speed is determined to be greater than a predetermined vertical speed value.

In another exemplary embodiment, an aircraft environmental control system (ECS) includes an engine bleed air manifold, a high stage valve, and an ECS controller. The engine bleed air manifold has at least a first inlet, a second inlet, and an outlet. The first and second inlets are each adapted to receive pressurized air from an aircraft gas turbine engine, and the outlet is adapted to supply the pressurized air to one or more ECS loads. The high stage valve is coupled to the engine bleed air manifold second inlet and is adapted to receive pressurized air from a high pressure compressor in the aircraft gas turbine engine. The high stage valve is coupled to receive valve commands and is operable, in response thereto, to move between a plurality of open positions, in which the engine bleed air manifold second inlet receives pressurized air from the high pressure compressor, and a closed position, in which the engine bleed air manifold second inlet does not receive pressurized air from the high pressure compressor. The ECS controller is coupled to the high stage valve and is configured to implement an engine bleed performance model specific to the aircraft gas turbine engine. The ECS controller is adapted to receive at least rotational speed data representative of a rotational speed of a component in the aircraft engine and vertical speed data representative of aircraft vertical speed. The ECS controller is responsive to at least these data to supply the valve commands to the high stage valve, determine a component speed setpoint value using the engine bleed performance model, and set an engine bleed air manifold pressure setpoint to a descent pressure setpoint if the rotational speed of the component is below the component speed setpoint value, or the aircraft vertical speed is less than a predetermined vertical speed value.

In still another exemplary embodiment, an environmental control system controller includes a processor that is configured to implement an engine bleed performance model specific to an aircraft engine. The processor is adapted to receive at least rotational speed data representative of a rotational speed of a component in the aircraft engine, and vertical speed data representative of aircraft vertical speed. The processor is responsive to at least these data to determine a component speed setpoint value using the engine bleed performance model, and set an engine bleed air manifold pressure setpoint to a descent pressure setpoint if the rotational speed of the component is below the component speed setpoint value, or the aircraft vertical speed is less than a predetermined vertical speed value.

Furthermore, other desirable features and characteristics of the aircraft cabin pressure descent detect and control system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description. In this regard, although a particular environmental control system embodiment is described, the general methodology described and claimed herein may be used with various other system embodiments. Moreover, while the system and method are described in the context of an aircraft environment, these could be implemented in other environments, if needed or desired.

It is additionally noted that the term vertical speed as is used herein refers to the actual vertical speed value, unless otherwise stated. As such, the aircraft vertical speed values described herein could be either positive (+) or negative (−) values. With this in mind, it is further noted that in the context of this description a vertical speed value of −20 distance/unit time is considered less than a vertical speed value of −15 distance/unit time, which is less than a vertical speed value of +10 distance/unit time, etc.

Figure 1:
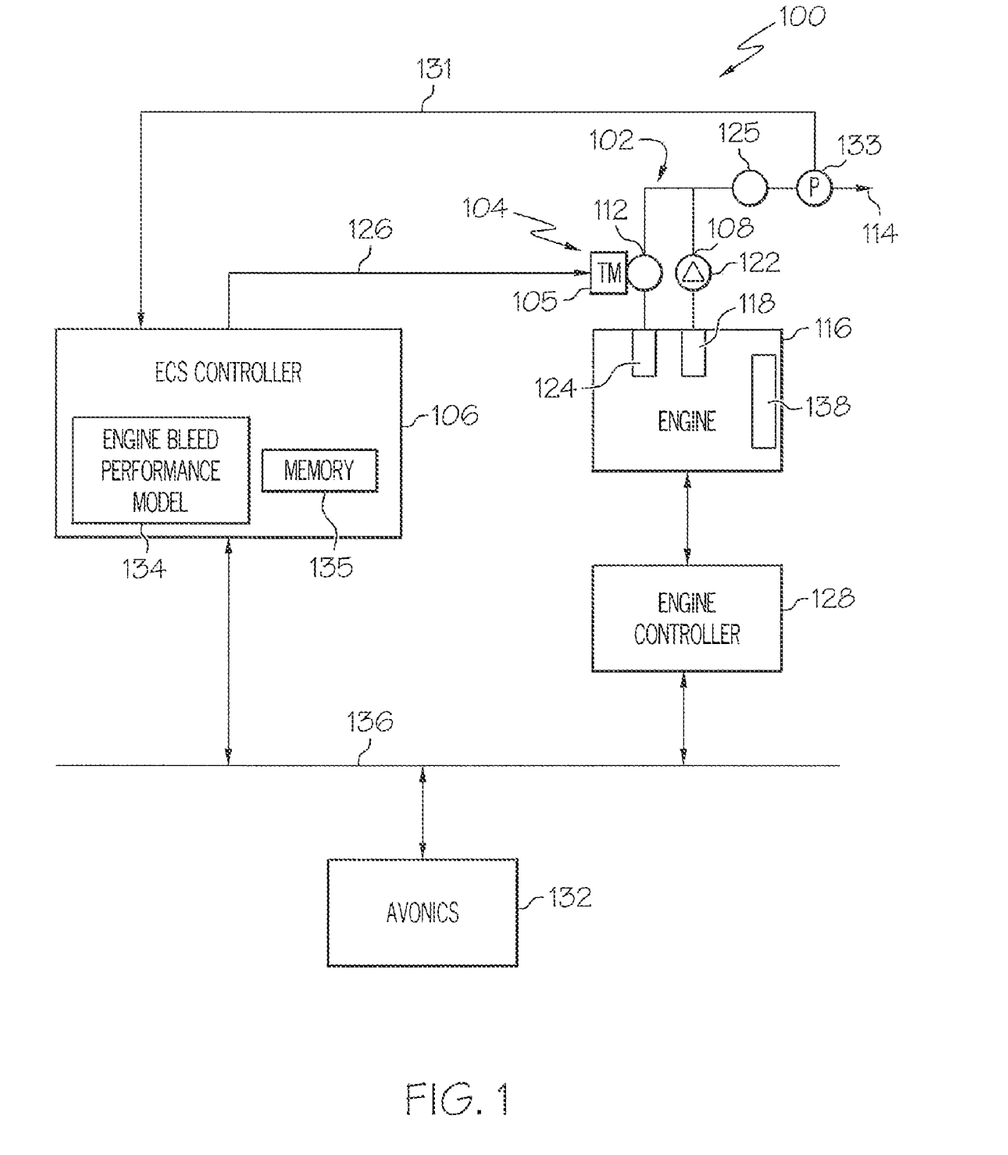
FIG. 1 is a functional block diagram of an exemplary embodiment of a portion of an environmental control system.

Turning now to FIG. 1, a functional block diagram of an exemplary embodiment of a portion of an environmental control system (ECS) 100 is depicted. The depicted ECS 100 includes an engine bleed air manifold 102, a high stage valve 104, and an ECS controller 106. The engine bleed air manifold 102 includes at least a first inlet 108, a second inlet 112, and an outlet 114. The engine bleed air manifold first and second inlets 108, 112 are each configured to receive pressurized air, at different relative pressure magnitudes, from different sections of an aircraft gas turbine engine 116, and the engine bleed air manifold outlet 114 is configured to direct the pressurized air to one or more non-illustrated ECS loads.

More specifically, the engine bleed air manifold first inlet 108 is coupled, via a check valve 122, to receive pressurized air from a relatively low-pressure air source 118 within the engine 116. The check valve 122, as is generally known, is configured to allow pressurized air to flow from the engine 116 into the engine bleed air manifold 102, and to prevent flow from the engine bleed air manifold 102 into the engine. The engine bleed air manifold second inlet 112 is coupled, via the high stage valve 104, to selectively receive pressurized air from a relatively high-pressure air source 124 within the engine 116. It will be appreciated that the relatively low-pressure air source 118 and the relatively high-pressure air source 124 may vary depending, for example, on the specific engine and/or on various system requirements. To provide some non-limiting examples, it will be appreciated that the relatively low-pressure air source 118 may be a low or intermediate pressure compressor within the engine 116, and that the relatively high-pressure air source 124 may be a high pressure compressor within the engine 116.

As FIG. 1 additionally depicts, the ECS 100 may include an additional valve 125 that is mounted on the engine bleed manifold 102 downstream of the high stage valve 104 and the check valve 122. The valve 125, if included, is preferably implemented as a suitable regulator valve, such as a pneumatic regulator valve, and is configured to ensure engine bleed air manifold pressure does not exceed a predetermined maximum pressure. It will be appreciated that the regulator valve 125 may be configured such that the predetermined maximum pressure is a single pressure value or, in some embodiments, the regulator valve 125 may be configured such that the predetermined maximum pressure may be set to a plurality of different pressure setpoints. In these latter embodiments, the pressure setpoints may be set via the ECS controller 106 or via non-illustrated cockpit switches.

The high stage valve 104 is coupled to receive valve commands 126 from the ECS controller 106. The high stage valve 104 is operable, in response the received valve commands 126, to move between a closed position and an open position. When the high stage valve 104 is in the closed position, the engine bleed air manifold second inlet 112 is fluidly isolated from, and thus does not receive pressurized air from, the relatively high-pressure air source 124. Conversely, when the high stage valve 104 is in an open position, the engine bleed air manifold second inlet 112 is fluidly coupled to, and thus receives pressurized air from, the relatively high-pressure air source 124. It will be appreciated that the high stage valve 104 may be variously configured to implement this functionality. In one particular embodiment, for example, the high stage valve 104 is a torque motor controlled valve. With such a configuration, a torque motor 105 receives the valve commands 126 from the ECS controller 106, and is responsive to the valve commands 126 to appropriately position the high stage valve 104.

The ECS controller 106 is configured to control the pressure in the engine bleed air manifold 102. To do so, the ECS controller 106 receives a pressure feedback signal 131 from a pressure sensor 133 that is disposed to sense engine bleed air manifold pressure. The ECS controller 106, in response to the pressure feedback signal 131, supplies the valve commands 126 to the high stage valve 104, as needed, to control the pressure in the engine bleed air manifold 102 to a control pressure setpoint. The control pressure setpoint to which the ECS controller 106 controls engine bleed air manifold pressure may vary with the flight phase of the aircraft. For example, when the aircraft is flying at its cruise altitude, the ECS controller 106 will control engine bleed air manifold pressure to a first pressure setpoint, which is referred to herein as the cruise pressure setpoint. However, when the aircraft is descending from its cruise altitude to, for example, land the aircraft, the ECS controller 106 will control engine bleed air manifold pressure to a second pressure setpoint, which is higher than the first pressure setpoint and which is referred to herein as the descent pressure setpoint. It may thus be appreciated that the ECS controller 106 is additionally configured to determine which pressure setpoint to which it should be controlling engine bleed air manifold pressure. The manner in which the ECS controller 106 implements this function will now be described.

As FIG. 1 depicts, the depicted ECS controller 106 is configured to implement, among other features and functions, an engine bleed performance model 134. The engine bleed performance model 134, which is preferably implemented via one or more suitably programmed processors, is preferably specific to the aircraft gas turbine engine 116 and, based on various data it receives, determines whether the relatively low-pressure air source 118 is capable of supplying sufficient bleed air to pressurize the engine bleed air manifold 102 to at least the cruise pressure setpoint. If the engine bleed performance model 134 determines that the relatively low-pressure air source 118 is not capable of doing so, which indicates that the aircraft is likely descending from its cruise altitude, then the ECS controller 106 increases the control pressure setpoint to the descent pressure setpoint. The ECS controller 106 will concomitantly supply valve commands to the high stage valve 104 that cause the high stage valve 104 to regulate its position to control engine bleed air manifold pressure to the higher descent pressure setpoint.

Before proceeding further, it is noted that that the engine 116 is typically configured such that the relatively low-pressure air source 118, in most instances, supplies sufficient bleed air flow so that the engine bleed air manifold pressure will meet or exceed the established control pressure setpoint (cruise pressure setpoint or descent pressure setpoint). Thus, the high stage valve 104 will, in most instances, be commanded to the closed position. It is additionally noted that this is a desirable condition, particularly during the aircraft cruise phase, as it reduces engine fuel consumption.

Returning now to the description, in order to implement the above-described functionality the ECS controller 106 is in operable communication with, and receives data from, an engine controller 128 and aircraft avionics 132. The engine controller 128, as is generally known, receives throttle commands and various engine data and, in response, controls the overall operation of the engine 116. The engine controller 128 may be any one of numerous suitable engine controllers, such as a full-authority digital engine controller (FADEC) or other suitable electronic engine controller (EEC). The aircraft avionics 132, as is also generally known, collects various aircraft-related data, various flight-related data, and various atmospheric data, and implements various functions including, for example, flight control, monitoring, communications, navigation, weather, and collision avoidance, just to name a few. It will be appreciated that the aircraft avionics 132 may also be variously implemented using any one of numerous suitable avionics suites.

No matter how the engine controller 128 and avionics 132 are specifically implemented, both are in operable communication with the ECS controller 106 via, for example, a suitable communication bus 136. The ECS controller 106, at least in the depicted embodiment, receives various engine data from the engine controller 128, and ambient condition data and aircraft data from the aircraft avionics 132. It is noted that the engine data, the ambient condition data, and the aircraft data that are supplied to the ECS controller 106 may vary. In the depicted embodiment, however, the ECS controller 106 receives at least rotational speed data representative of the rotational speed of a component in the engine 116, ambient condition data representative of at least total air pressure and temperature outside the aircraft, altitude data representative of aircraft altitude, and vertical speed data representative of aircraft vertical speed. It will be appreciated that the component for which the rotational speed data are supplied to the ECS controller 106 may be any one of numerous suitable components in the engine 116. In the depicted embodiment, however, the component is the engine fan 138, and the rotational speed data are data representative of corrected engine fan speed.

The ECS controller 106, upon receipt of the engine data, the ambient condition data, and the aircraft data, determines a component speed setpoint value and the aircraft vertical speed. The ECS controller 106, based on the determined component speed setpoint value and the determined vertical speed, sets the engine bleed air manifold pressure control setpoint. More specifically, and as will be described in more detail further below, if the rotational speed of the aircraft engine component (e.g., the corrected engine fan speed) is below the component speed setpoint value or the vertical speed is less than a predetermined vertical speed value, then the engine bleed air manifold pressure control setpoint is set to the descent pressure setpoint, otherwise it remains at the cruise pressure setpoint.

In the depicted embodiment, in which the ECS controller 106 implements the engine bleed performance model 134, the engine bleed performance model 134 is supplied with data suitable for it to calculate the engine bleed pressure ratio for the current aircraft flight conditions. The ECS controller 106 then calculates (or otherwise determines) the component speed setpoint from the calculated engine bleed pressure ratio. In the depicted embodiment, in which the rotational speed data are representative of corrected engine fan speed, it may be appreciated that the component speed setpoint is a corrected engine fan speed setpoint. It will additionally be appreciated that the ECS controller 106 may determine the component speed setpoint using a plurality of different pressures for the relatively low-pressure air source 118, depending upon aircraft altitude. For example, in particular embodiment for aircraft altitudes of 0-20,000 feet, 20,000-30,000 feet, and 30,000-45,000 feet, pressures for the relatively low-pressure air source 118 of 22 psig, 20 psig, and 22 psig, respectively, are used.

Before proceeding on, it should be noted that in some embodiments the ECS controller 106 may not implement the engine bleed performance model 134. In such embodiments, the ECS controller 106 determines the component speed setpoint from, for example, a look-up table stored in a memory 135 that includes a plurality of predetermined component speed setpoints for various engine and flight conditions. In particular, based on the data received from the engine controller 128 and the aircraft avionics 132, the ECS controller 106 would determine what the appropriate component speed setpoint is for the current flight conditions. If, as described above, the actual rotational speed of the aircraft engine component (e.g., the corrected engine fan speed) is below the component speed setpoint value, then ECS controller 106 will set the engine bleed air manifold pressure control setpoint to the descent pressure setpoint. Otherwise, the ECS controller 106 will keep the engine bleed air manifold pressure control setpoint at the cruise pressure setpoint.

The general process implemented in the ECS controller 106 to determine whether to switch the engine bleed air manifold pressure control setpoint from the cruise pressure setpoint to the descent pressure setpoint was just described. This process, as well as the process the ECS controller 106 implements to reset the engine bleed air manifold pressure control setpoint from the descent pressure setpoint back to the cruise pressure setpoint, will now be described in more detail. In doing so, reference should now be made to FIG. 2, which depicts the process in flowchart form.

Figure 2:
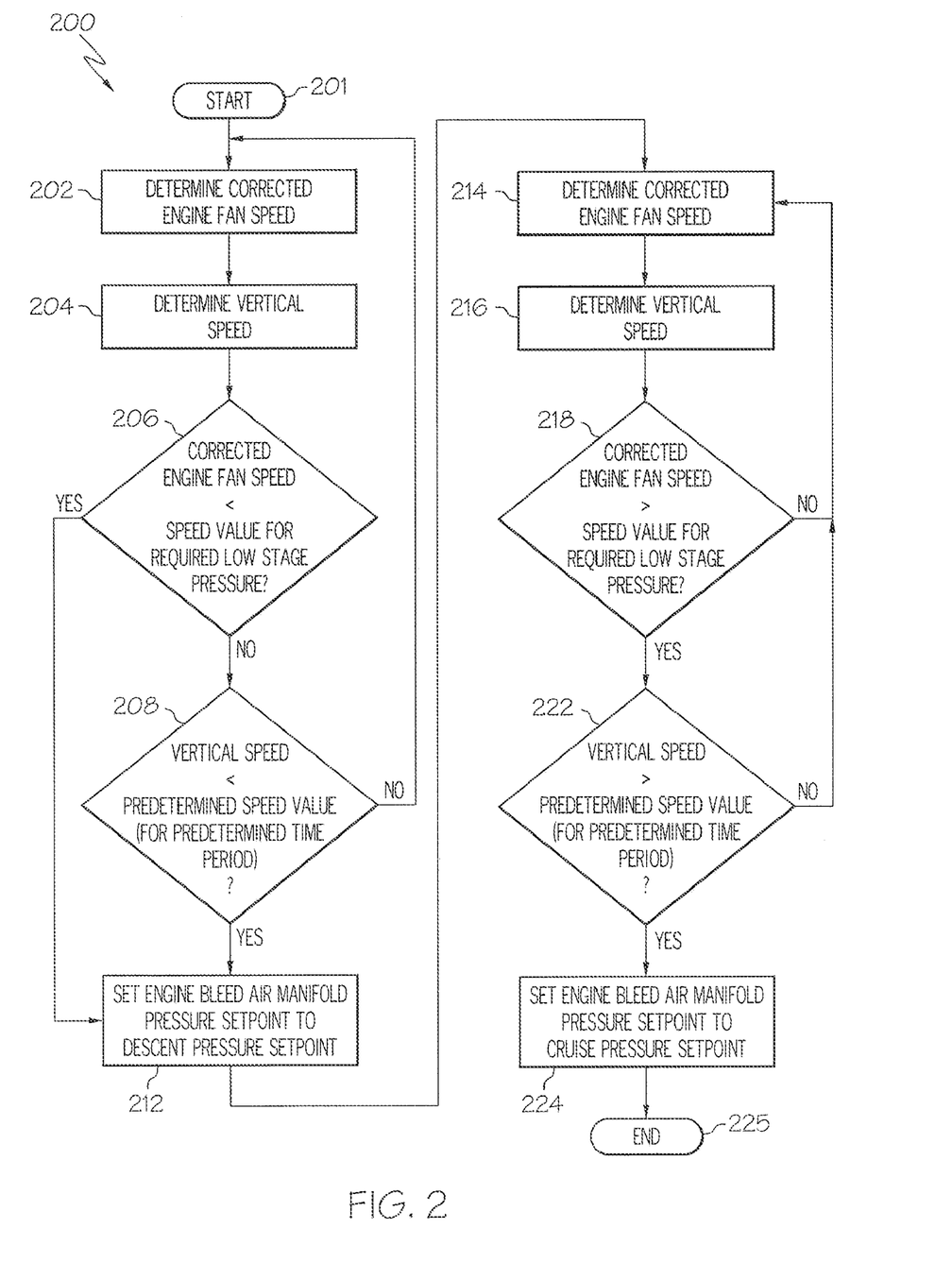
FIG. 2 depicts an exemplary process, which may be implemented in the system of FIG. 1, for determining whether to switch an engine bleed air manifold pressure control setpoint from a cruise pressure setpoint to a descent pressure setpoint.

The process 200 begins by determining the corrected engine fan speed (202) and the vertical speed of the aircraft (204). A determination is then made as to whether the corrected engine fan speed is less than the speed value needed for the relatively low-pressure source 118 to pressurize the engine bleed air manifold 102 to the cruise pressure setpoint (206). In the above described embodiments this determination is made by either calculating the component speed setpoint value using the engine bleed performance model and comparing the corrected engine fan speed to the calculated setpoint value, or selecting the appropriate component speed setpoint value from a look-up table, based on current engine, aircraft, and flight conditions, and then comparing the corrected engine fan speed to the setpoint value. No matter the specific manner in which this determination (206) is made, if the corrected engine fan speed is less than the component speed setpoint value, then the engine bleed manifold control pressure setpoint is set to the descent pressure setpoint (212).

If the above determination (206) indicates that the corrected engine fan speed is not less than the component speed setpoint value, then a determination is made as to whether the vertical speed is less than a first predetermined vertical speed value (208). It is noted that in a particular preferred embodiment, this determination (208) includes determining whether the vertical speed is less than the first predetermined vertical speed value for a first predetermined time period. If the vertical speed is less than the first predetermined vertical speed value (for the first predetermined time period), then the engine bleed manifold control pressure setpoint is set to the descent pressure setpoint (212). If, however, the vertical speed is not less than the first predetermined vertical speed value (for the first predetermined time period), then the engine bleed manifold control pressure setpoint remains at the cruise pressure setpoint and the previous process steps are repeated.

Before describing the remaining portions of the process, it should be appreciated that the above-described steps (206, 208) could be performed in either order. That is, the determination as to whether the vertical speed is less than the first predetermined vertical speed value could be performed before the determination as to whether the corrected engine fan speed is less than the component speed setpoint value. Moreover, the first predetermined vertical speed value and the first predetermined time period may vary depending, for example, on the particular aircraft design. In one particular embodiment, a vertical speed value of −225 feet/minute was found suitable, and a time period of 10 seconds was found suitable.

Returning once again to the description of the process 200, if the engine bleed air manifold control pressure setpoint is indeed set to the descent pressure setpoint (212), the ECS controller 106 will control engine bleed air manifold pressure to this higher control pressure setpoint until a determination is made that the control pressure setpoint should be reset. To do so, the corrected engine fan speed (214) and the vertical speed of the aircraft (216) are once again determined. Thereafter, the determinations as to whether the corrected engine fan speed is greater than the component speed setpoint value (218) and as to whether the vertical speed is greater than a second predetermined vertical speed value (222), preferably for a second predetermined time period, are also made. However, rather than resetting the engine bleed air manifold control pressure setpoint if either of these determinations is true (e.g., OR-logic), the engine bleed air manifold control pressure setpoint is reset to the cruise pressure setpoint (224) only when both of these determinations are true (e.g., AND-logic), and most preferably when both determinations are true for the second predetermined time period. The second predetermined speed value and the second predetermined time period may also vary. In one particular embodiment, a vertical speed value of 100 feet/minute and a time period of 4 minutes were found suitable.

Figure 3:
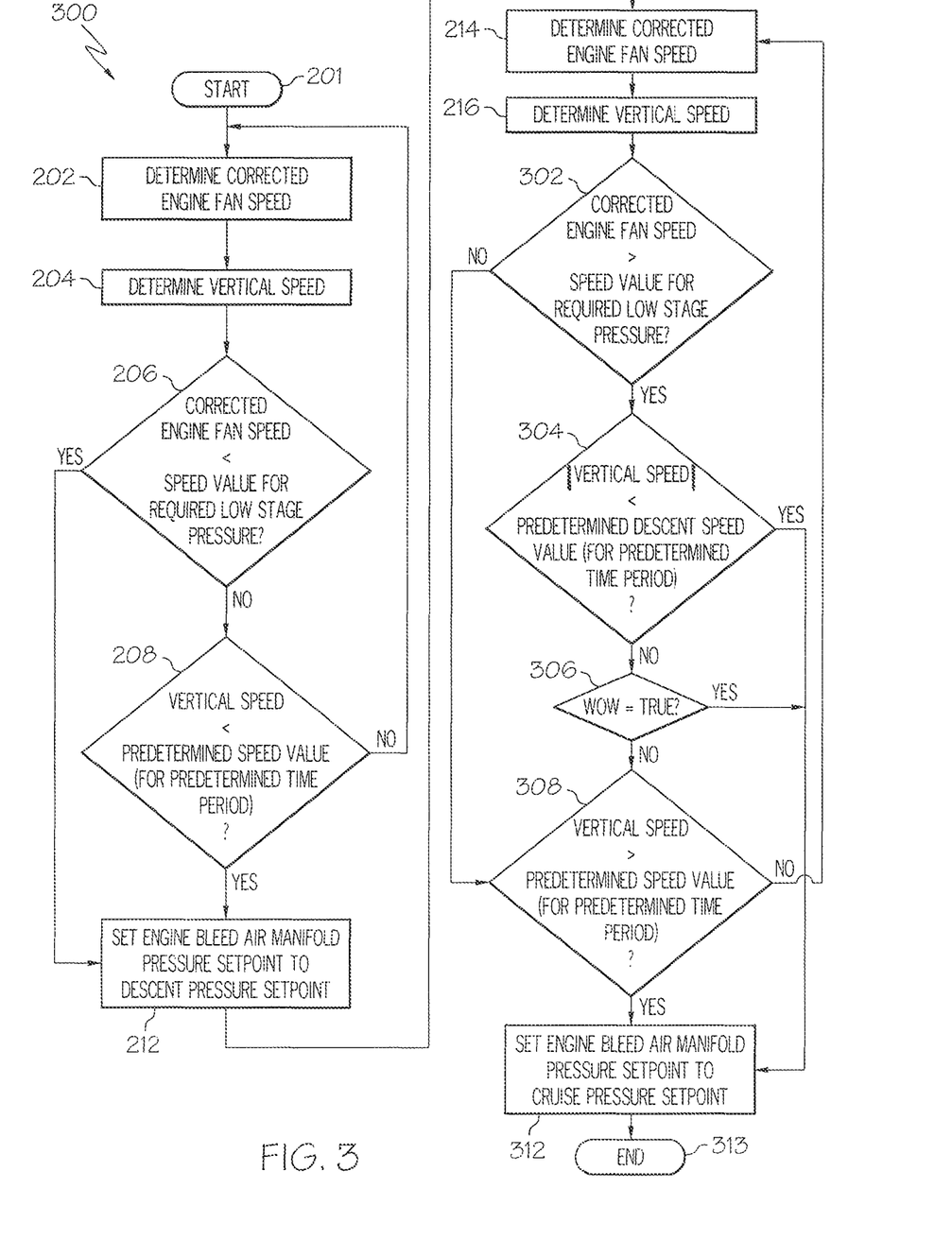
FIG. 3 depicts an exemplary alternative process, which may also be implemented in the system of FIG. 1, for determining whether to switch an engine bleed air manifold pressure control setpoint from a cruise pressure setpoint to a descent pressure setpoint.

In an alternative embodiment of the process 300, which is depicted in flowchart form in FIG. 3, many of the previous steps are implemented. However, the particular circumstances under which the control pressure setpoint is reset differ. In particular, it is seen that with the alternative process 300 the corrected engine fan speed (214) and the vertical speed of the aircraft (216) are once again determined. Thereafter, the determination as to whether the corrected engine fan speed is greater than the component speed setpoint value (302) is made. In accordance with this alternative process 300, if the corrected engine fan speed is greater than the component speed setpoint value, then the determination is made as to whether the magnitude of the vertical speed is less than a third predetermined vertical speed value, preferably for a third predetermined time period (304). If, however, the corrected engine fan speed is not greater than the component speed setpoint value, then another determination (308) that is described further below is made.

If the magnitude of the vertical speed is less than the third predetermined vertical speed value for the third predetermined time period, then the above-mentioned determination (308), which will be described below, is made. Conversely, if the magnitude of the vertical speed is not less than the third predetermined vertical speed value for the third predetermined time period, then a determination is made as to whether the aircraft is on the ground (306). In the depicted embodiment, this is accomplished via a signal from a non-illustrated weight-on-wheels (WOW) sensor (e.g., WOW=TRUE). If it is determined that the aircraft is on the ground, then the engine bleed air manifold control pressure setpoint is reset to the cruise pressure setpoint (312). If the aircraft is not, then the above-mentioned determination (308), which will now be described, is made.

The above-mentioned determination (308) is also a determination associated with aircraft vertical speed. In this instance, the determination is whether the vertical speed is greater than a fourth predetermined vertical speed value for a fourth predetermined time period. If so, then the engine bleed air manifold control pressure setpoint is reset to the cruise pressure setpoint (312). If not, then the engine bleed air manifold control pressure setpoint remains at the descent pressure setpoint.

With the alternative process 300 described above and depicted in FIG. 3, it is seen that the engine bleed air manifold control pressure setpoint is reset if: (1) the corrected engine fan speed is greater than the component speed setpoint value AND either the magnitude of the vertical speed is less than the third predetermined vertical speed value for the third predetermined time period or the aircraft is on the ground; OR (2)

the vertical speed is greater than the fourth predetermined vertical speed value for the fourth predetermined time period.

Figure 4:
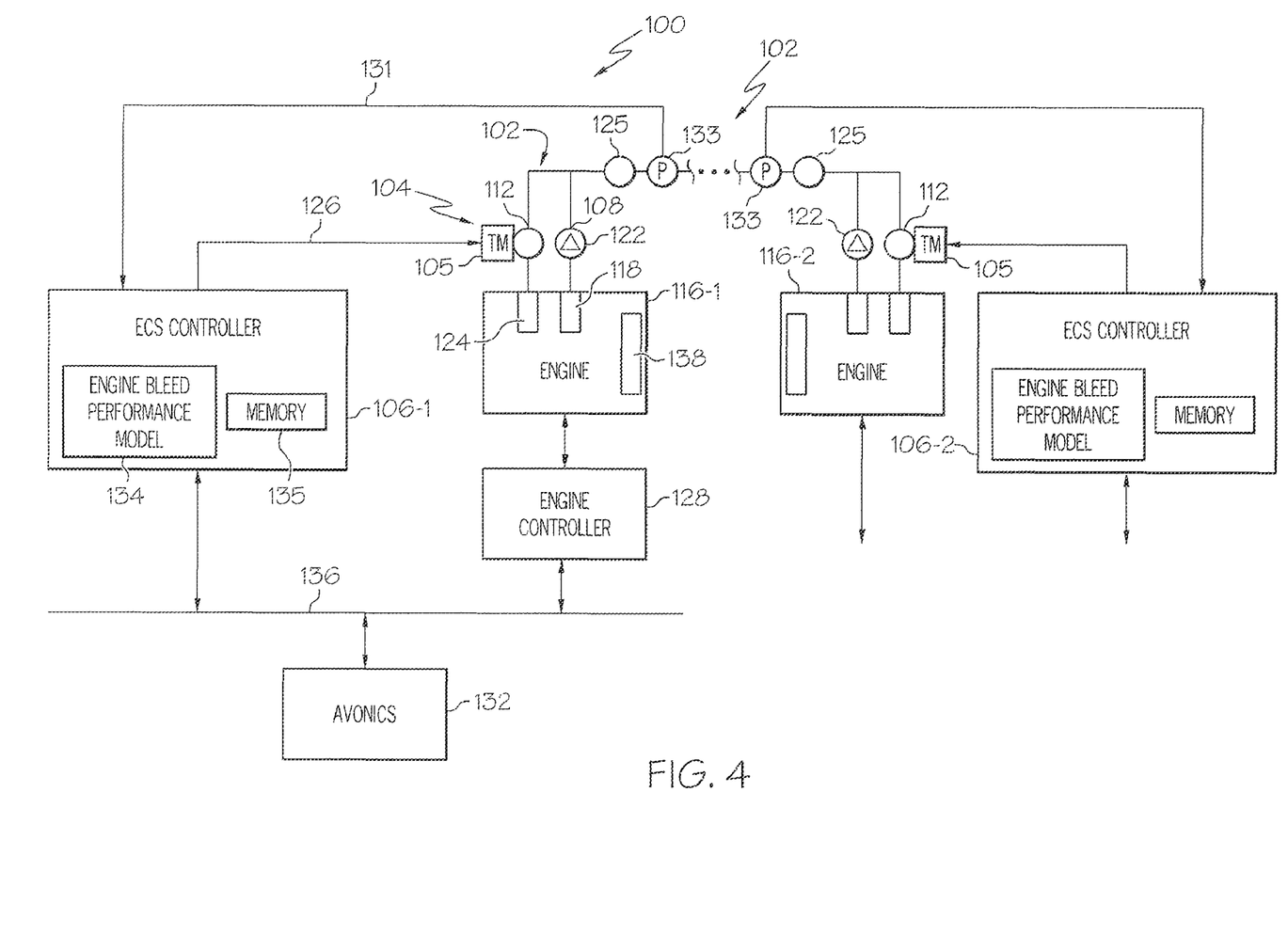
FIG. 4 is a functional block diagram of an exemplary alternative embodiment of a portion of an environmental control system for an aircraft with two engines that supply a common engine bleed air manifold.

In addition to the alternative processes 200, 300 described herein, alternative system configurations, which may result in slightly modified processes, may be implemented. For example, and as FIG. 4 depicts, many aircraft not only include two engines 116 (e.g., 116-1, 116-2) and thus two ECS controllers 106 (e.g., 106-1, 106-2), but the two engines 116 may share a common engine bleed air manifold 102. For aircraft that are configured in this manner, the ECS controllers 106 each implement slightly modified ones of the above-described processes 200, 300. In particular, in addition to the above-described processes, the ECS controllers 106 are configured such that if one of the ECS controllers 106-1 (106-2) determines the engine bleed air manifold control pressure setpoint should be set to the descent pressure setpoint, then the other ECS controller 106-2 (106-1) will automatically set its engine bleed air manifold control pressure setpoint to the descent pressure setpoint, and engine bleed air manifold pressure will be controlled to this higher pressure. The engine bleed air manifold pressure will continue to be controlled to the descent pressure setpoint until both ECS controllers 106 determine that the engine bleed air manifold control pressure setpoint should be reset to the cruise pressure setpoint.

One final point to be made is that the predetermined time periods are referenced, for clarity, as four different time periods. That is, the terms first predetermined time period, second predetermined time period, third predetermined time period, and fourth predetermined time period are used. It should be noted, however, that this does not necessarily mean that these four time periods are always, or have to be, unequal time periods. Rather, two or more (or all) of the time periods could be equal, if needed or desired.

The systems and methods described herein provide for improved control of aircraft cabin pressure, and more specifically bleed air supply pressure, during aircraft descent. As a result, disconcerting bleed air pressure fluctuations and/or cabin pressure fluctuations and/or bleed air control pressure setpoint fluctuations are eliminated or at least minimized.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of setting an aircraft engine bleed air manifold control pressure setpoint to one of a descent pressure setpoint or a cruise pressure setpoint, the method comprising the steps of:
   determining a rotational speed of an aircraft engine component;
   determining a component speed setpoint value;
   determining aircraft vertical speed; and
   setting the engine bleed air manifold control pressure setpoint to the descent pressure setpoint if:
   (i) the determined rotational speed of the aircraft engine component is below the component speed setpoint value, or
   (ii) the aircraft vertical speed is determined to be less than a first predetermined vertical speed value.

2. The method of claim 1, wherein the engine bleed air manifold control pressure setpoint is set to the descent pressure setpoint if:
   (i) the determined rotational speed of the aircraft engine component is below the component speed setpoint value, or
   (ii) the aircraft vertical speed is determined to be less than the first predetermined vertical speed value for a first predetermined time period.

3. The method of claim 1, further comprising:
   if the engine bleed air manifold pressure setpoint is set to the descent pressure setpoint, setting the engine bleed air manifold pressure setpoint to the cruise pressure setpoint if:
   (i) the determined rotational speed is above a component speed reset value, and
   (ii) the aircraft vertical speed is determined to be greater than a second predetermined vertical speed value.

4. The method of claim 3, further comprising:
   if the engine bleed air manifold pressure setpoint is set to the descent pressure setpoint, setting the engine bleed air manifold pressure setpoint to the cruise pressure setpoint if:
   (i) the determined rotational speed is above a component speed reset value, and
   (ii) the aircraft vertical speed is determined to be greater than the second predetermined vertical speed value for a second predetermined time period.

5. The method of claim 1, further comprising
   determining whether the aircraft is on the ground;
   determining a magnitude of the aircraft vertical speed; and
   if the engine bleed air manifold pressure setpoint is set to the descent pressure setpoint, setting the engine bleed air manifold pressure setpoint to the cruise pressure setpoint if:
   (i) the determined rotational speed is above a component speed reset value and either (a) the magnitude of the aircraft vertical speed is determined to be less than a third predetermined vertical speed value for a third predetermined time period or (b) the aircraft is on the ground, or
   (ii) the aircraft vertical speed is determined to be greater than a fourth predetermined vertical speed value for a fourth predetermined time period.

6. The method of claim 1, further comprising:
   controlling engine bleed air manifold pressure to be at least the engine bleed air manifold control pressure setpoint.

7. The method of claim 1, further comprising:
   determining aircraft altitude; and
   determining the component speed setpoint value based at least in part on the determined aircraft altitude.

8. The method of claim 7, further comprising:
   storing a look-up table having a plurality of component speed setpoint values; and
   selecting one of the plurality of component speed setpoint values from the look-up table as the component speed setpoint value.

9. The method of claim 1, further comprising:
   determining bleed pressure ratio; and
   determining the component speed setpoint value based on the determined bleed pressure ratio.

10. The method of claim 1, further comprising:
    supplying engine data to an engine bleed performance model specific to the aircraft engine; and determining the component speed setpoint value using the engine data that are supplied to engine bleed performance model.

11. An aircraft environmental control system (ECS), comprising:
an engine bleed air manifold having at least a first inlet, a second inlet, and an outlet, the first and second inlets each adapted to receive pressurized air from an aircraft gas turbine engine, the outlet adapted to supply the pressurized air to one or more ECS loads;
a high stage valve coupled to the engine bleed air manifold second inlet and adapted to receive pressurized air from a high pressure compressor in the aircraft gas turbine engine, the high stage valve coupled to receive valve commands and operable, in response thereto, to move between a plurality of open positions, in which the engine bleed air manifold second inlet receives pressurized air from the high pressure compressor, and a closed position, in which the engine bleed air manifold second inlet does not receive pressurized air from the high pressure compressor; and
an ECS controller coupled to the high stage valve and configured to implement an engine bleed performance model specific to the aircraft gas turbine engine, the ECS controller adapted to receive at least (i) rotational speed data representative of a rotational speed of a component in the aircraft engine and (ii) vertical speed data representative of aircraft vertical speed, the ECS controller responsive to at least these data to (i) supply the valve commands to the high stage valve, (ii) determine a component speed setpoint value using the engine bleed performance model and (iii) set an engine bleed air manifold pressure setpoint to a descent pressure setpoint if:
(a) the rotational speed of the component is below the component speed setpoint value, or
(b) the aircraft vertical speed is less than a first predetermined vertical speed value.

12. The system of claim 11, wherein the ECS controller is responsive to set the engine bleed air manifold pressure setpoint to the descent pressure setpoint if:
(a) the rotational speed of the component is below the component speed setpoint value, or
(b) the aircraft vertical speed is less than the first predetermined vertical speed value for a first predetermined time period.

13. The system of claim 11, wherein the ECS controller is further responsive, if the engine bleed air manifold pressure setpoint is set to the descent pressure setpoint, to reset the engine bleed air manifold pressure setpoint to the cruise pressure setpoint if:
(i) the rotational speed is above a component speed reset value, and
(ii) the aircraft vertical speed is greater than a second predetermined vertical speed value.

14. The system of claim 13, wherein the ECS controller is further responsive, if the engine bleed air manifold pressure setpoint is set to the descent pressure setpoint, to reset the engine bleed air manifold pressure setpoint to the cruise pressure setpoint if:
(i) the rotational speed is above the component speed reset value, and
(ii) the aircraft vertical speed is greater than the second predetermined vertical speed value for a second predetermined time period.

15. The system of claim 11, wherein the ECS controller is further adapted to receive a signal representative of whether or not the aircraft is on the ground, and wherein the ECS controller is further responsive to, if the engine bleed air manifold pressure setpoint is set to the descent pressure setpoint, to determine a magnitude of the aircraft vertical speed and to reset the engine bleed air manifold pressure setpoint to the cruise pressure setpoint if:
(i) the rotational speed is above a component speed reset value and either (a) the magnitude of the aircraft vertical speed is less than a third predetermined vertical speed value for a third predetermined time period or (b) the aircraft is on the ground, or
(ii) the aircraft vertical speed is a magnitude that is greater than a fourth predetermined vertical speed value for a fourth predetermined time period.

16. The system of claim 11, wherein the ECS controller controls engine bleed air manifold pressure to be at least the engine bleed air manifold control pressure setpoint.

17. The system of claim 11, wherein:
the ECS controller is further adapted to receive a signal representative of aircraft altitude; and
the ECS controller is further responsive to (i) determine aircraft altitude and (ii) determine the component speed setpoint value based at least in part on the aircraft altitude.

18. The system of claim 17, further comprising:
memory in operable communication with the ECS controller, the memory storing a look-up table having a plurality of component speed setpoint values,
wherein the ECS controller selects one of the plurality of component speed setpoint values from the look-up table as the component speed setpoint value.

19. The system of claim 11, wherein the ECS controller is further responsive to:
determine bleed pressure ratio; and
determine the component speed setpoint value based on the determined bleed pressure ratio.

20. The system of claim 11, wherein:
the ECS controller implements to an engine bleed performance model specific to the aircraft engine; and
the ECS controller determines the component speed setpoint value using the engine data that are supplied to engine bleed performance model.

21. The system of claim 11, wherein:
the aircraft engine component is a fan; and
the determined rotational speed is corrected engine fan speed.

22. The system of claim 11, wherein the ECS controller is a first ECS controller, the engine bleed air manifold further includes a third inlet and a fourth inlet, the third and fourth inlets each adapted to receive pressurized air from a second aircraft gas turbine engine, and wherein the system further comprises:
a second high stage valve coupled to the engine bleed air manifold and adapted to receive pressurized air from a high pressure compressor in a second aircraft gas turbine engine, the high stage valve coupled to receive valve commands and operable, in response thereto, to move between a plurality of open positions, in which the engine bleed air manifold fourth inlet receives pressurized air from the high pressure compressor in the second aircraft gas turbine engine, and a closed position, in which the engine bleed air manifold fourth inlet does not receive pressurized air from the high pressure compressor in the second aircraft gas turbine engine;
a second ECS controller coupled to the second high stage valve and configured to implement a second engine bleed performance model specific to the second aircraft gas turbine engine, the second ECS controller adapted to receive at least (i) rotational speed data representative of a rotational speed of a component in the second aircraft engine and (ii) vertical speed data representative of aircraft vertical speed, the second ECS controller responsive to at least these data to (i) supply the valve commands to the second high stage valve, (ii) determine a second component speed setpoint value using the second engine bleed performance model and (iii) set an engine bleed air manifold pressure setpoint to the descent pressure setpoint if:
  (a) the rotational speed of the component is below the second component speed setpoint value,
  (b) the aircraft vertical speed is less than the first predetermined vertical speed value, or
  (c) the first ECS controller sets its engine bleed air manifold pressure setpoint to the descent pressure setpoint.

23. The system of claim 22, wherein the first ECS controller automatically sets its engine bleed air manifold pressure setpoint to the descent pressure setpoint if the second ECS controller sets its engine bleed air manifold pressure setpoint to the descent pressure setpoint.

24. The system of claim 23, wherein the first ECS controller and the second ECS controller are further responsive, if its engine bleed air manifold pressure setpoint is set to the descent pressure setpoint, to reset its engine bleed air manifold pressure setpoint to the cruise pressure setpoint only when both the first and second ECS controllers determine its engine bleed air manifold pressure setpoint should be reset.

25. An environmental control system controller, comprising:
  a processor configured to implement an engine bleed performance model specific to an aircraft engine, the processor adapted to receive at least (i) rotational speed data representative of a rotational speed of a component in the aircraft engine and (ii) vertical speed data representative of aircraft vertical speed, the processor responsive to at least these data to (i) determine a component speed setpoint value using the engine bleed performance model and (ii) set an engine bleed air manifold pressure setpoint to a descent pressure setpoint if:
    (a) the rotational speed of the component is below the component speed setpoint value, or
    (b) the aircraft vertical speed is less than a predetermined vertical speed value.

* * * * *